May 21, 1957     J. BUDOFF     2,793,064
AUTOMOBILE DOOR LOCK BUTTON SAFETY DEVICE
Filed Oct. 8, 1954
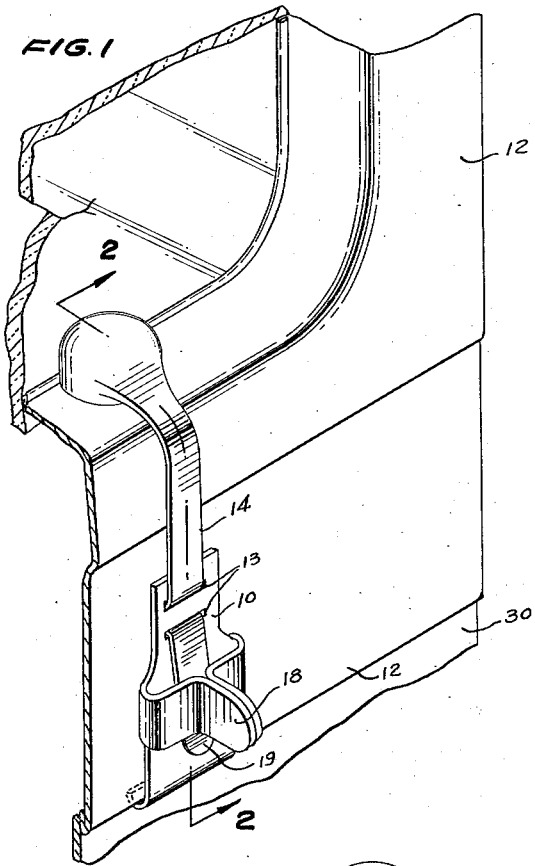
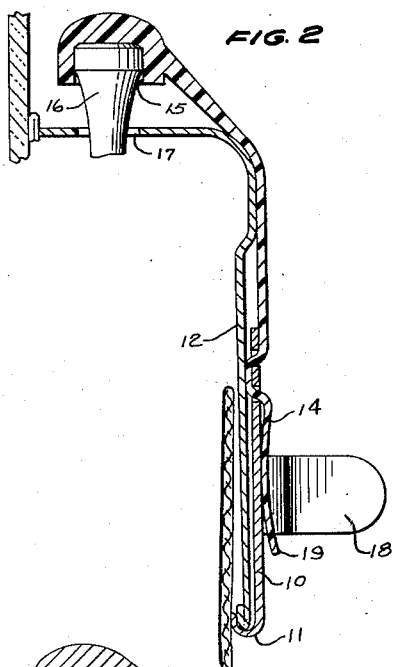
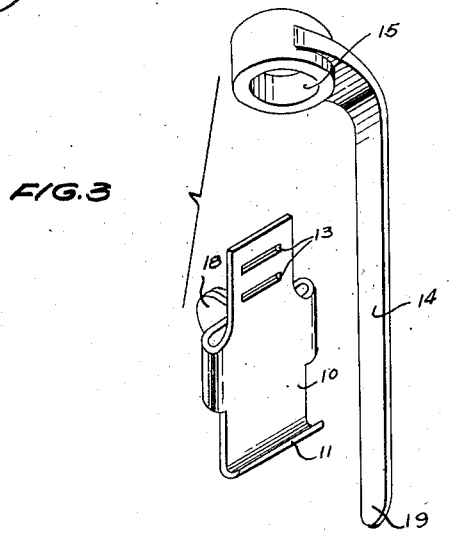
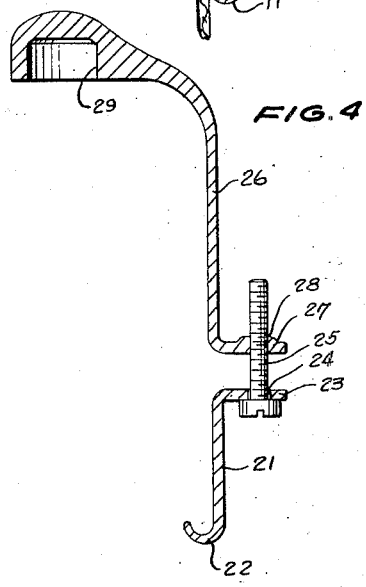
INVENTOR.
JULIUS BUDOFF
BY
ATTORNEYS

2,793,064

AUTOMOBILE DOOR LOCK BUTTON SAFETY DEVICE

Julius Budoff, Monticello, N. Y.

Application October 8, 1954, Serial No. 461,130

2 Claims. (Cl. 292—288)

The present invention relates to safety devices for use with automobile door locks having a button projecting from the window frame opening.

The principal object of the present invention is to provide a device for holding down the button which projects through the window opening molding of an automobile door which button in the downward position prevents the door from being accidentally opened.

Another object of the present invention is to provide a device of neat and attractive appearance which is easily attached to the window opening molding, and one which is not easily removed therefrom by a child but may be constructed of material sufficiently taut when properly applied that it requires an adult to remove it for unlocking the door.

A further object of the present invention is to provide a device for holding down the button of a door lock in an automobile which will not mar the molding or the window frame and may be constructed of flexible, relatively soft rubber, plastic, or the like.

A still further object of the present invention is to provide a modified form of the device which may be constructed of plastic or metal and provided with a thumb screw for adjusting the device on the door molding in order to install the device with sufficient rigidity that a child cannot ordinarily displace.

These and other objects and advantages of the present invention will be fully apparent from the following description when taken in connection with the annexed drawing, in which:

Figure 1 is a view in perspective of a corner of an automobile door showing the molding upon which the present invention is hooked;

Figure 2 is a side view in cross section on line 2—2 of Figure 1;

Figure 3 is an exploded view showing the two portions of the invention; and

Figure 4 is a side view in cross section of a further form of the invention.

Referring in greater detail to the drawing in which like numerals designate like parts throughout the several views, the invention is seen to consist of a guard having an upstanding support member 10 having a hook 11 formed at the lower end thereof and projecting upwardly from one side for engaging the lower edge of the molding 12, as seen in Figure 1.

The support member 10 is formed with a pair of parallel slots 13 in its upper end remote from the hook 11. An upstanding and flexible body member 14 is formed at its upper end with an overhanging dome 15 which receives the button 16 as shown in Figure 2. The button 16 projects through the aperture 17 in the upper end of the molding 12 and is operatively connected to the door lock mechanism (not shown) so that when it is in the downward position the door lock mechanism may not be operated to unlock the door.

The body member 14 is formed at its other end with means for adjustably connecting the body member to the support member with the recess in spaced relation to the support member and with the button 16 received in the dome 15. This means includes the other end of the body member 14 which is, in the first embodiment shown in Figures 1 to 3, the strap end of the body member 14 and is connected to the support member 10 by having it enter one of the slots 13 and return through the other slot 13 as shown best in Figure 1. The portion of the body member 14 where it penetrates through the other side of the support member forms a non-marring portion to protect the molding 12 from damage.

The support member 10 is also formed with the outwardly extending tab portions 18 which form a handle and serve also to protect the free end 19 of the body member 14 from the fingers of children who might accidentally and inadvertently dislodge the body member 14 from the slots 13.

In the embodiment shown in Figure 4, the guard device of the present invention is made of a support member 21 having a hook 22 at the lower end for engaging the molding 12 and an outwardly projecting arm 23 provided with an opening 24 in which a thumb screw or bolt 25 is positioned to connect the body member 26 at its lower end where it is provided with a similar outwardly projecting arm 27 having a threaded hole 28 therethrough. The upper end of the body member 26 is formed with a similar dome 29 to receive the button as in the first embodiment of the present invention. This form of the invention may be made of plastic, lightweight metal, or other material sufficiently rigid so that it is not easily bent or removed by children once the thumb screw or bolt 25 is tightened.

It will be seen that the guard device of the present invention in either one of its embodiment can be used with a vehicle door lock button of the type which projects upwardly from an aperture in the molding overlying the sides of the window opening in the vehicle door and will hold the button down so that the door cannot be unlocked after the device of the present invention has been installed. The hook of the present device, in either of its modifications, is intended to be hooked under the lower edge of the molding remote from the window opening, where it overlies the body panel 30 as seen in Figure 1.

It is a feature of the invention that in the first embodiment the body member 14 be only elastic enough that it permit stretching the short distance necessary to permit the hook to engage under the molding after it has once been adjusted for use with a particular automobile. In the second embodiment, the body member 26 should have only enough spring in its upper end to permit the hook to engage the molding as the result of a downward pull of some force applied to the hook.

While only preferred embodiments of the present invention have been here shown and described, other embodiments of the invention may be made and practiced and many changes and modifications may be made within the scope of the appended claims without departing from the spirit of the invention.

What is claimed is:

1. For use with an automobile door lock button of the type which projects upwardly from an aperture in the molding overlying the sides of the window opening in the automobile door and is movable upwardly through said aperture to a position at which the door is unlocked and downwardly through said aperture to a position at which the door is locked, a guard device comprising an upstanding support member having a hook formed on the lower end thereof adapted to be positioned in face to face relation with respect to said molding and having said hook adapted to engage the lower edge of said molding remote from said window opening, an upstanding body member formed with an overhanging dome at the upper end arranged in superimposed relation with respect to said support member and having said dome adapted to demountably receive said button, and adjustable means connecting said body member to said support member.

2. For use with an automobile door lock button of the type which projects upwardly from an aperture in the molding overlying the sides of the window opening in the automobile door and is movable upwardly through said aperture to a position at which the door is unlocked and downwardly through said aperture to a position at which the door is locked, a guard device comprising an upstanding support member having a hook formed on the lower end thereof adapted to be positioned in face to face relation with respect to said molding and having said hook adapted to engage the lower edge of said molding remote from said window opening, an upstanding flexible body member formed with an overhanging dome at the upper end arranged in superimposed relation with respect to said support member and having said dome adapted to demountably receive said button, and adjustable means connecting said body member to said support member.

References Cited in the file of this patent

UNITED STATES PATENTS

| | | |
|---|---|---|
| 213,590 | Peck | Mar. 25, 1879 |
| 2,495,860 | Miller | Jan. 31, 1950 |
| 2,537,380 | Travis | Jan. 9, 1951 |